United States Patent [19]

Lombard et al.

[11] Patent Number: 4,702,208
[45] Date of Patent: Oct. 27, 1987

[54] DEVICE FOR ELECTRICAL ACTUATION OF THE ACCELERATOR OF AN INTERNAL COMBUSTION ENGINE

[75] Inventors: Claude Lombard, Le Chesnay; Jean-Paul Brisset, Thiais; Jean-Luc Marais, Nanterre; Gérard Catier, Issy Les Moulineaux, all of France

[73] Assignee: Regie Nationale des Usines Renault, Boulogne Billancourt, France

[21] Appl. No.: 833,173

[22] Filed: Feb. 25, 1986

[30] Foreign Application Priority Data

Feb. 25, 1985 [FR] France .................... 85 02670

[51] Int. Cl.⁴ .................................... F02D 33/00
[52] U.S. Cl. .................................... 123/339; 123/361
[58] Field of Search .................... 123/339, 350, 361; 180/178, 179; 74/513, 626, 785

[56] References Cited

U.S. PATENT DOCUMENTS

| 3,363,480 | 1/1968 | Murphy | 74/626 |
| 3,527,118 | 9/1970 | Jenson et al. | 74/626 |
| 3,794,293 | 2/1974 | Matuda et al. | 74/626 |
| 4,526,060 | 7/1985 | Watanabe | 74/626 |

FOREIGN PATENT DOCUMENTS 165836  9/1984  Japan .................... 123/361

*Primary Examiner*—William A. Cuchlinski, Jr.
*Attorney, Agent, or Firm*—Oblon, Fisher, Spivak, McClelland & Maier

[57] ABSTRACT

Device for electrical actuation of the accelerator of an internal combustion engine, particularly of a motor vehicle, comprising a reduction gear interposed between an electric motor and an element for actuating the accelerator. The reduction gear comprises a planetary gear train whose sun gear 12 is solid in rotation with the shaft of the electric motor. An internal ring gear 11 is connected to the actuation element 4 and the planet carrier 14 is pulled elastically by a return spring 15 to actuate an electric contact switch 17.

9 Claims, 9 Drawing Figures

DEVICE FOR ELECTRICAL ACTUATION OF THE ACCELERATOR OF AN INTERNAL COMBUSTION ENGINE

FIELD OF THE INVENTION

This invention relates to a device for electrical actuation of the accelerator of an internal combustion engine, particularly a motor vehicle, comprising: a reduction gear interposed between an electric motor and an actuation element, an element for controlling the accelerator, means for returning the control element to an idle position, and an electric contact switch that makes it possible to detect if the actuation element is effectively controlling the control element or if the control element is placed under the direct control of the driver of the vehicle acting mechanically on an accelerator lever or pedal.

BACKGROUND OF THE INVENTION

These devices, associated with an electronic control system, are known particularly for providing the automatic control of the butterfly valve of a carburetor or of an equivalent control element such as the fuel injection pump lever for diesel cycle vehicles, while preserving the usual mechanical control from the accelerator pedal, so as to make it possible, on the one hand, for the driver to permit the automatic control of the speed of the vehicle, for example by a system of imposed speed (VI) observing the speed limits, while preserving at any moment the possibility of manually accelerating the engine to pass in overspeed for example and, on the other hand, to provide the idling speed control of the internal combustion engine of the vehicle. These known devices prove relatively bulky and expensive to make and to use, at the level of the reduction gear and especially of the electric contact switch which plays an essential role, by indicating to the control system, when it is functioning as a speed or idling regulator, whether the control element is placed under the direct control of the driver or not.

OBJECT OF THE INVENTION

This invention aims particularly at simplifying these two elements and at reducing their cost while improving their reliability and the possibilities of controlling the contact switch, to make an actuation device which is easier to house and to connect to the control element of the accelerator which, moreover, always comprises a manual control.

SUMMARY OF THE INVENTION

For this purpose, according to the invention, the reduction gear comprises a planetary gear train whose sun gear is solid in rotation with the shaft of the electric motor and whose internal ring gear is connected mechanically to the actuation element while the planet carrier is mounted to oscillate between two positions and, on the one hand, is pulled elastically by a return spring toward a first position in which it places the electric contact switch in a first state and, on the other hand, is placed in a second position in which it places the electric contact switch in a second state, in opposition to the return spring, under the action of the return means of the control element when this control element is controlled by the actuation element.

According to a first embodiment, the planet carrier constitutes a crosswise lever which is hinged in rotation around the shaft of the electric motor from which it is separated by an intermediate bearing and which carries, at diametrically opposite points, the two respective support shafts of two planet pinions which mesh simultaneously with the outer toothing of the sun gear and with the inner toothing of the ring gear of the planetary gear train. One of the ends of the lever is able to come in contact with an actuation plunger of the electric contact switch under the action of the rotation of the lever, while the other end of the lever rests on the helical return spring.

The return spring is housed at least partially in a housing or blind hole made in the lever and surrounds a stop pin able to strike against the bottom of the housing or blind hole to limit the angle of rotation of the planet carrier. The position of the stop end of the stop pin is adjustable in relation to the bottom of the housing or blind hole to make it possible to control the actuation travel of the electric contact switch.

The end of the crosswise lever which rests on the helical return spring is placed with clearance between two stop cheeks which are solid with the body of the reduction gear and which project on a face of this body. The return spring rests on a first of these cheeks and pushes a face of this lever back in contact with the second cheek, while the means for returning the control element tend to cause the lever to rotate in the direction of the first cheek in contact with the stop pin.

According to another embodiment, the planet carrier constitutes a crosswise lever which is hinged in rotation around the shaft of the electric motor, from which it is separated by an intermediate bearing. The crosswise lever carries, at diametrically opposite points, the two respective support shafts of two planet pinions which mesh simultaneously with the outer toothing of the sun gear and with the inner toothing of the ring gear. An extension of the crosswise lever carries an actuation pin of the electric contact switch, while one of the support shafts of the planet pinions rests on a torsion spring constituting the return spring. The torsion spring is wound around an extension of the planet carrier, and the actuation pin is engaged with a clearance (j) in a closed hole of an adjusting plate whose position is adjustable in relation to the contact switch to position the actuation travel of the contact switch plunger limited to the clearance (j). The plunger of the actuation contact switch is placed in the immediate vicinity of the actuation pin so that the contact switch is actuated when the control element is controlled by the electric element.

According to an advantageous arrangement, the actuation contact switch is kept locked in position by the adjusting plate, which is itself locked by an adjusting screw.

The electric motor for actuating the planetary gear train is a stepping motor which is supplied with electric current, either continuously to keep its position or in pulses to advance or go back step by step to make the position of the motor in rotation independent of the setting of the return means of the control element of the accelerator and dependent solely on the electric pulses received. The electric motor is made so that cutting off of its electric power supply, particularly to place the control element under the sole control of the driver, eliminates the drag and braking torques of electrical origin acting on the motor.

BRIEF DESCRIPTION OF THE DRAWINGS

Other objects, advantages and characteristics will become apparent from reading the description of various embodiments of the invention, given by way of nonlimiting example and with reference to the accompanying drawing, wherein.

DETAILED DESCRIPTION OF THE PRESENTLY PREFERRED EMBODIMENTS

Figure 1:
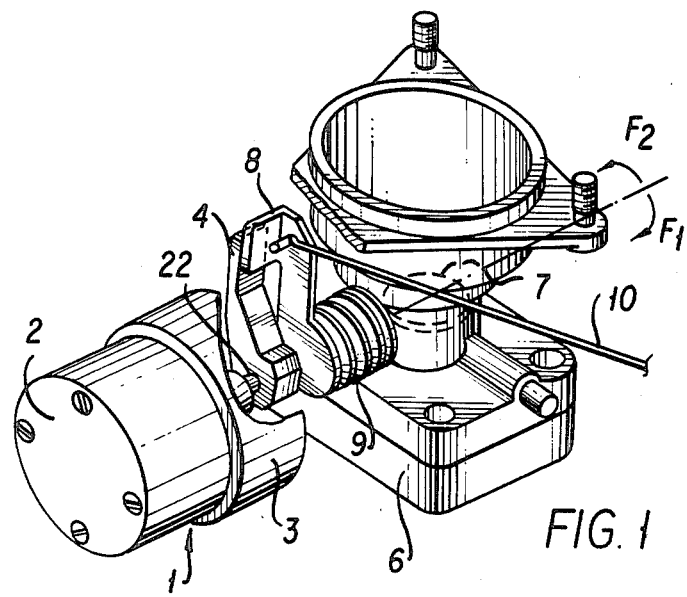
FIG. 1 is a view in perspective of an electric motor actuating device according to the invention applied to the driving of the butterfly valve for controlling the gases of a vehicle internal combustion engine.

The actuation device shown in FIG. 1 comprises a gearmotor group 1 consisting of an electric motor 2, a reduction gear unit 3, a control arm 4 and an electric contact switch constituting one of the objects of the invention and making it possible to detect if there is contact between the control arm 4 and a lever 8 controlling a butterfly valve 7 mounted in a carburetor body 6. The lever is pulled toward its closing position by a spring 9. Moreover, the lever 8 is connected by a cable 10 to an accelerator pedal (not shown), making it possible for the driver of the vehicle to control the speed of the internal combustion engine (not shown) on which the carburetor body 6 is mounted.

THE FIRST EMBODIMENT

In operation, the control arm 4, whose position is controlled by the electric motor 2 via the reduction gear unit 3, behaves like a variable mechanical stop. In case the changes in position of the butterfly valve 7 are performed under the control of the electric motor 2, they take place either in the direction shown by an arrow $F_1$ by thrust of the control arm 4 driven by the electric motor 2 on the lever 8 in opposition to the spring 9, or in the direction of an arrow $F_2$ under the action of the spring 9 pulling the lever 8 resting against the control arm 4. If the changes in position of the butterfly valve 7 are controlled mechanically from the position of the accelerator pedal, they take place in the direction of arrow $F_1$ by pulling of the cable 10 on the lever 8 or in the direction of arrow $F_2$ under the action of the spring 9.

When the actuation device is under the control of a standard electronic control circuit (not shown) to subject the speed of the internal combustion engine to a set value aiming either at controlling the speed of the vehicle, or at controlling the idling speed of the engine, the electric contact switch according to the invention makes it possible to detect if the internal combustion engine is under the effective control of the actuation device 1, the control arm 4 and the lever 8 then resting on one another, or under the control of the driver by the accelerator pedal and the cable 10, the control arm 4 and the lever 8 then being separated from one another.

The actuation of the contact switch, when the electronic circuit is functioning as a speed regulator, has the consequence that the control arm 4 preserves the position that it occupied during a temporary action on the accelerator pedal, for example in case of passing another vehicle, and thus makes it possible then to return automatically under the control of the electronic surveillance actuation device without intervention on the part of the driver.

Figure 2A:
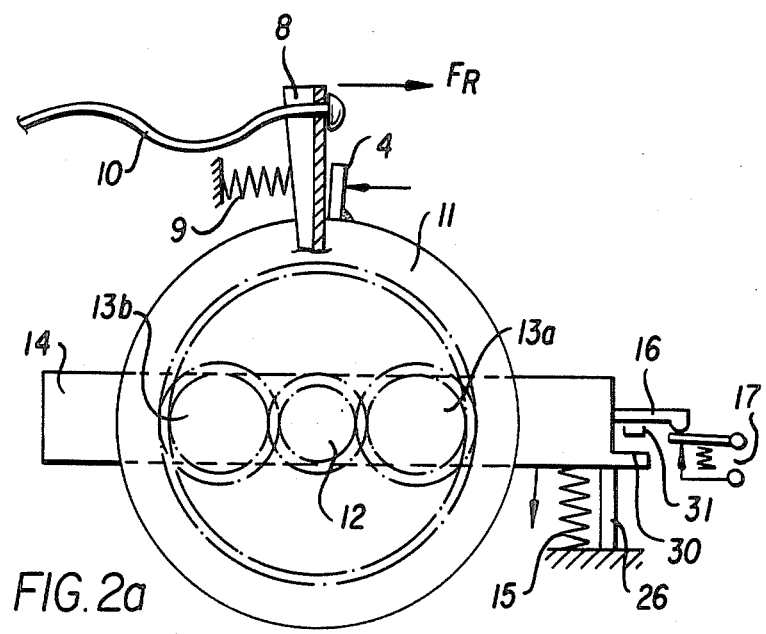
FIG. 2a is a diagrammatic representation of the reduction stage and of the electric contact switch of the device according to the invention, when it is in operation.
Figure 2B:
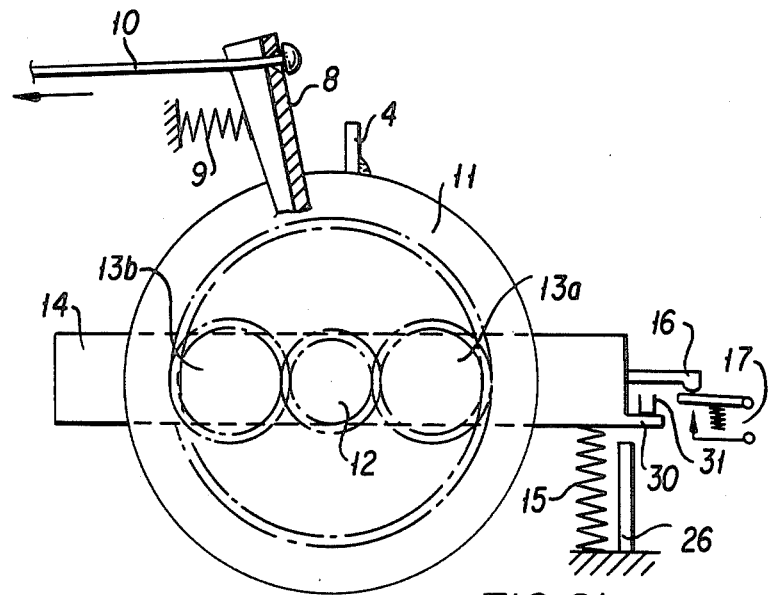
FIG. 2b is a diagrammatic representation identical with that of FIG. 2a but when the actuation device is momentarily cut off by a resumption of manual control by the driver of the vehicle.

In the diagrammatic representation of FIGS. 2a and 2b, it is seen that the connection between, on the one hand, an internal ring gear 11 of a planetary gear train connected in rotation to the control arm 4 and, on the other hand, a sun gear 12 connected in rotation to the rotor of the electric motor 2, is made by two planet pinions 13a and 13b whose rotating shafts (not shown) are solid with a planet carrier consisting of an oscillating crosswise lever 14 which rests on a return spring 15. The crosswise lever 14 exhibits on the side of the spring 15 a plunger 16 able to actuate an electric contact switch 17 and a wing 30 able to rest in the direction of the meshing of the return spring 15 on a stop pin 26 and on the opposite side on a stationary cheek 31.

It is seen in FIG. 2a that the action of the accelerator pedal is not exerted on the cable 10, but that the electric motor 2 acts on the lever 8 in opposition to the spring 9 for closing the carburetor via the sun gear 12, the planet pinions 13a and 13b, and the internal ring gear 11 solid with the control arm 4. Reaction FR of the spring 9 tends to cause the crosswise lever 14 to rotate in opposition to the return spring 15 until closing electric contact switch 17 and bringing in crosswise lever 14 against the stop pin 26.

FIG. 2b illustrates the case of the resumption of manual control by the driver when the imposed speed control of the vehicle is still engaged or when the system functions as an idling speed regulator. The action of the spring 9 on the control arm 4 is canceled and the reaction torque on the crosswise lever 14 disappears, which makes it possible for the return spring 15 to push the crosswise lever 14 back in rotation until bringing the wing 30 in contact with the stationary cheek 31 and to open the electric contact switch 17. In response to this opening, the electronic control circuit controls the maintaining in position of the control arm 4 ready to resume the control of the speed of the vehicle after the temporary phase of manual control. When the effect of the resistant torque of the spring 9 on the control arm 4 is eliminated, this elimination can be identified by the electric contact switch 17 either by turning the circuit on or off. To achieve an identification by turning the circuit on, it is enough for example to place the contact switch 17 on the other side of the plunger 16.

Figure 3:
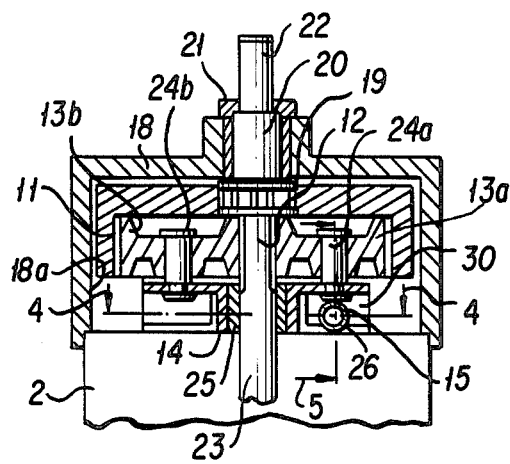
FIG. 3 is a detail view in section, through the longitudinal axis, of the reduction stage with its arm supporting the planet pinions included in the reduction gear.

FIG. 3 shows in longitudinal section the elements contained inside a body 18 enclosing the speed reduction gear with planetary gear train fastened to the carburetor body 6. The internal ring gear 11 is housed in a bore 18a in the body 18, and it is connected by grooves 19 to an output shaft 20 which goes through a bearing 21 mounted in the body 18. The output shaft 20 is connected by a tip 22 (see also in FIG. 1), for example of rectangular section, to the control arm 4.

The electric motor 2 is represented in tearaway view as having an output shaft 23 which has been. The output shaft 23 with a part on which the gear toothing forming the sun gear 12 is engaged inside the body 18 to mesh with the two planet pinions 13a and 13b which also mesh with the inner toothing of the internal ring gear 11.

According to the invention, the planet pinions 13a and 13b are carried by shafts 24a and 24b fastened to a planet carrier consisting of the oscillating crosswise lever 14 hinged in rotation around the output shaft 23 of the electric motor, from which it is separated by an intermediate bearing 25 consisting here of an extension of the output bearing of the electric motor 2. The return spring 15 appears in section in FIG. 3 in the position that it occupies around the stop pin 26. This arrangement of the return spring 15 corresponds to that shown in section in FIGS. 4 and 5.

Figure 4:
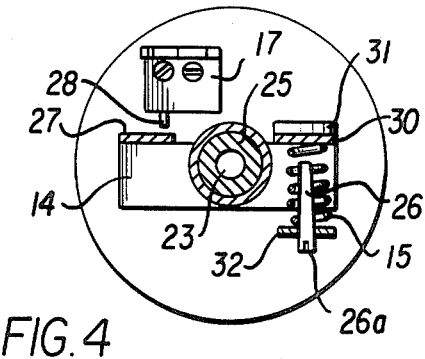
FIG. 4 is a partial view of the section along plane IV—IV shown in FIG. 3.

FIG. 4 shows that it is possible to have the crosswise lever 14 hinged in rotation around the intermediate bearing 25. A lateral end face 27 of the crosswise lever 14 is able to come to rest on an actuation plunger 28 of the electric contact switch 17 and to actuate the electric contact switch 17 by pushing the return spring 15 back. The wing 30 of the crosswise lever 14 rests on the return spring 15. It is placed with clearance between the previously mentioned stationary 31 and a cheek 32 provided on a flange of the body 18 or of the electric motor 2. The return spring 15 rests at one of its ends on the cheek 32 and at the other end on the wing 30. The stationary check 31 and the adjacent end of the stop pin 26 constitute stops that cooperate with the wing 30 to delimit the two positions of the crosswise lever 14 corresponding respectively to the open and closed state of the contact switch 17.

Figure 5:
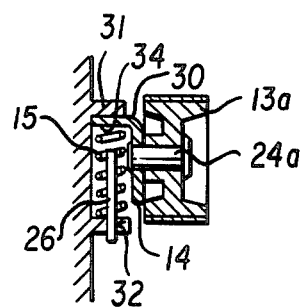
FIG. 5 is a detail view in section along plane V—V shown in FIG. 3.

In FIG. 5 corresponding to FIG. 3, it is seen that a hollow housing 34 is formed by bending and folding back, into an L, the wing 30 of the crosswise lever 14 (see also FIGS. 3 and 4) to receive the return spring 15 wound around the stop pin 26 which is fastened, for example by screwing, to the cheek 32. Under the action of the return force of the return spring 15, the wing 30 is pushed back in contact with the stationary cheek 31 in the absence of reaction on the internal ring gear 11. The stop pin 26 of the return spring 15 exhibits a screw slot 26a thanks to which its position can be adjusted by using a screwdriver passed through an adjustment hole (not shown) in the body 18.

The operating mode of the device for actuating the carburetor butterfly valve which has just been described in connection with FIGS. 3 to 5 will now be explained. When the electronic control circuit is not engaged to control automatically the speed of the vehicle, or is not functioning as an idling speed regulator, the driver freely actuates the lever 8 for controlling the butterfly valve 7, via the cable 10. When he releases the cable 10, the return torque of the spring 9 is sufficient to push the control arm 4 back and to cause the output shaft 23 of the electric motor 2 (not fed) back via the reversible planetary gear train. If the electric motor remains in inactive position with the control arm 4 placed on the return path of the lever 8, the planet pinions 13a, 13b can rotate around their axis, and the crosswise lever 14 remains in the position where it is pushed back by the return spring 15.

When the electronic control circuit is operating to control automatically the speed of the vehicle, the accelerator pedal, and therefore the cable 10, is released and the electric motor 2 is fed. If the output shaft 23 of the motor rotates, it drives, via the sun gear 12, the planet pinions 13a, 13b and the internal ring gear 11, the control arm 4 in rotation to bring the butterfly valve 7 of the motor to the position corresponding to the rated speed of the vehicle. Under the action of the reaction torque resulting from the application of force FA on the internal ring gear 11, a consequence of the mechanical thrust of the spring 9 on the lever 8 resting on the control arm 4, the crosswise lever 14 is kept against the stop pin 26 in opposition to the return force of the return spring 15 and actuates the actuating plunger 28 of the contact switch 17. The contact switch 17 is connected to the electronic control circuit of the vehicle, and it indicates to this circuit that it has effectively taken over the control of the speed of the vehicle. During stationary phases of the control, the output shaft 23 does not rotate, and the spring 9 continues to apply the lever 8 to the control arm 4, the contact switch 17 being kept in the same state. If the driver desires to resume quickly the control of the speed of his vehicle, to pass for example, he pulls on the cable 10 by his accelerator pedal, and the return spring 15 pushes the crosswise lever 14 back. This opens (or closes if the contact switch 17 is placed on the other side of the plunger 16) the contact switch 17, which transmits to the electronic control circuit the data indicating that the driver has temporarily taken control of the speed of the vehicle.

The solution proposed for the electric motor 2 (whose stator 35 and rotor 36 appear in FIG. 6) in the context of this invention is that of a standard stepping motor which is supplied with electric current, either continuously to maintain its position, or in pulses to advance or go back step by step. The maintaining torque of the motor when it is fed is clearly greater than the return torque exerted on the internal ring gear 11 by the spring 9.

The electric motor 2 is further made so that cutting off of its electric power supply, particularly to place the butterfly value 7 of the carburetor under the sole control of the driver, eliminates the drag or braking torques of electrical origin acting on the motor and thus makes possible a quick return of the control arm 4 to its original position under the action of the return torque of the spring 9, which has only to overcome friction. The use of the planetary gear train thus makes it possible to place a reduction gear of minimum bulk and of reduced friction with a stationary electric contact switch of better reliability than the mobile contact systems, particularly due to the fact that it can be contained in a sealed box protected from the outside environment.

THE SECOND EMBODIMENT

Figure 6:
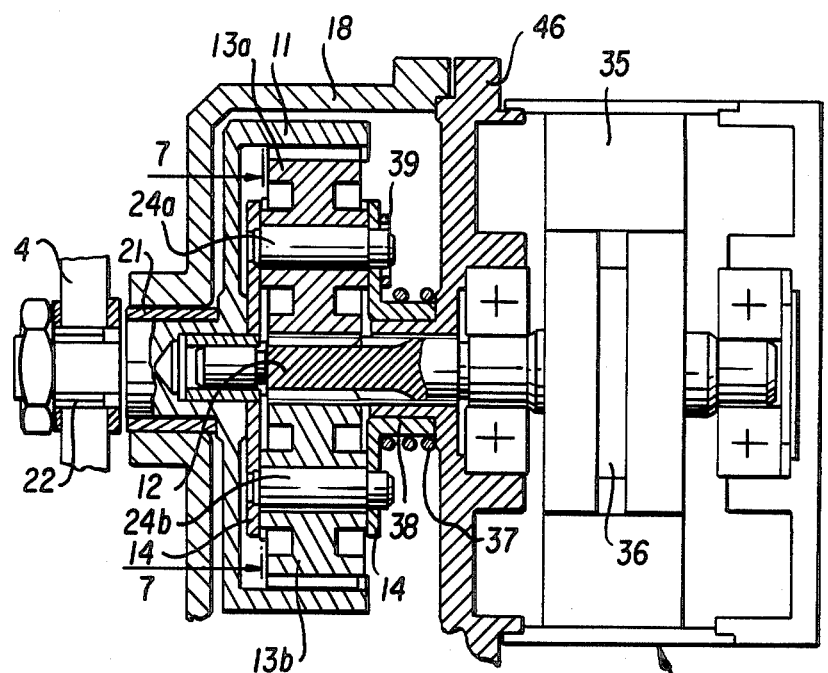
FIG. 6 is a view in longitudinal section with tearaways of another embodiment of the reduction stage and of the drive motor with a spiral return spring for the planet carrier.
Figure 8:
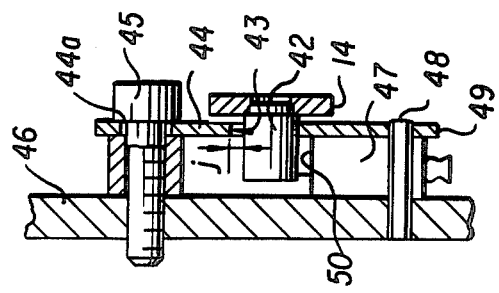
FIG. 8 is a partial view in section along VIII—VIII of FIG. 7 that causes the adjusting plate and the electric contact switch to appear.
Figure 7:
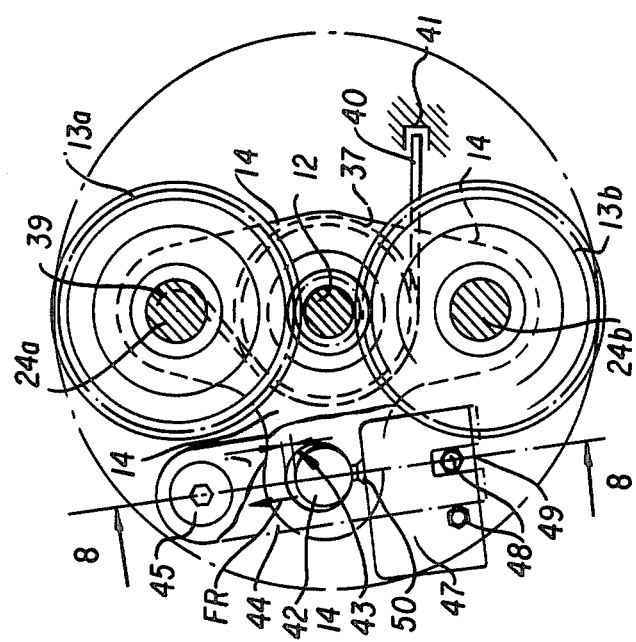
FIG. 7 is a partial view in cross section with tearaways along plane VII—VII of FIG. 6.

In the embodiment shown in FIGS. 6 to 8, the identical elements carry the same reference numbers as before. In this embodiment, the helical return spring 15 of the planet carrier is replaced with a spiral spring 37 wound around an extension 38 of the crosswise lever 14 made of two plates, one located on end side of the planet pinions 13a and 13b. The spiral spring 37 has a hook-shaped end 39 and a rod-shaped end 40. The hook-shaped end 39 rests on the shaft 24a of the planet pinion 13a and therefore rests on the crosswise lever 14. At its rod-shaped end 40, the spiral spring 37 rests in a housing 41 of the body 18. The internal ring gear 11 is connected by grooves on the tip 22 to the control arm 4.

According to a feature of this embodiment, one of the plates of the crosswise lever 14 carries a stop and actuation pin 42 that can be seen in FIGS. 7 and 8. The stop and actuation pin 42 is engaged during operation in a hole 43 made in an adjusting plate 44 fastened rigidly but adjustably in translation thanks to a hole 44a through an adjusting screw 45 on an inner face of a driving output flange 46 (see FIG. 6). An electric microcontact switch 47 is fastened to the driving output flange 46 by protruding elastic pins 48 which are also used to guide longitudinally the adjusting plate 44 for example, by engagement of one of the elastic pins 48 in a groove 49 of the adjusting plate 44. The electric microcontact switch 47 comprises a plunger 50 which is placed opposite and in the immediate vicinity of the stop and actuation pin 42.

Before the actuation device shown in FIGS. 6 to 8 is put into operation, it is necessary to adjust it. For this purpose, as is seen in FIGS. 7 and 8, a clearance (j) exists between the hole 43 and the stop and actuation pin 42, and the adjusting plate 44 must be locked by the adjusting screw 45 in such a position that, when the stop and actuation pin 42 goes through the clearance (j) from the actuation position at the bottom of the electric microcontact switch 47, the plunger 50 ceases to be actuated.

When the electric motor 2 is not under voltage, no torque is exerted on the crosswise lever 14, and the spiral spring 37 actuates the plunger of the electric microcontact switch 47. When the actuation device is in operation, as in the case of FIGS. 3 to 6, the reaction exerted on the internal ring gear 11 under the action of the spring 9 is exerted in opposition to the return torque of the spiral spring 37 to move the crosswise lever 14 in rotation along arrow FR in FIG. 7. The stop and actuation pin 42 driven by the crosswise lever 14 (see FIG. 8) then goes through the clearance (j) in the direction FR and frees the plunger 50 of the electric microcontact switch 47. The electronic control circuit is then informed by the electric microcontact switch 47 that the butterfly valve 7 of the carburetor is under the control of the electric motor 2.

If the driver temporarily resumes control of the accelerator of the vehicle, the reaction torque due to the spring 9 disappears (see preceding FIG. 2b), and the return torque of the spiral spring 37 is again exerted in the direction opposite FR on the crosswise lever 14 to push back, by the stop and actuation pin 42, the plunger 50 of the electric microcontact switch 47. This indicates to the electronic control circuit either that it must keep in memory the position of the rotor 36 of the electric motor 2 or that a position for controlling the idling speed is being moved away from.

As soon as the driver lets up on the accelerator pedal, the lever 8, under the action of the spring 9 of the butterfly valve 7, resumes pressing suddenly on the control arm 4. This pushes back, by the planetary gear train, the crosswise lever 14 in opposition to the spiral spring 37. The stop and actuation pin 42 goes through the clearance (j) and strikes against the bottom of the hole 43. This movement (j) is sufficient to free the plunger 50 of the electric microcontact switch 47. This configuration has the advantage that the plunger 50 of the electric microcontact switch 47 is not subjected to impacts when the driver lets up on the accelerator pedal.

If, however, it is desired to place the electric microcontact switch 47 in driven-home position of the plunger 50 when the electric motor 2 effectively controls the butterfly valve 7, according to the embodiment shown in FIGS. 6 to 8, it is enough the place the electric microcontact switch 47 on the opposite side in relation to the stop and actuation pin 42 i.e., in the place of the adjusting screw 45, which is itself fastened to the driving output flange 46 in the place of the electric microcontact switch 47. The plunger 50 of the electric microcontact switch 47 is then placed opposite and in the immediate vicinity of the stop and actuation pin 42, the movements of which are always limited by the sides of the hole 43.

Of course, this invention is not limited to the embodiments described and shown, and it is capable of numerous variants accessible to a man of the art without going outside the spirit of the invention.

We claim:

1. Device for electrical actuation of the accelerator of an internal combustion engine, particularly a motor vehicle, comprising a reduction gear, interposed between an electric motor and an actuation element, an element for controlling the accelerator, means for returning this control element to an idle position, and an electric contact switch that makes it possible to detect if the actuation element is effectively controlling the control element or if the control element is placed under the direct control of the driver of the vehicle acting mechanically on an accelerator lever or pedal, wherein the reduction gear comprises a planetary gear train whose sun gear (12) is solid in rotation with the shaft (23) of the electric motor (2) and whose internal ring gear (11) is connected mechanically to the actuation element (4) while the planet carrier (14) is mounted to oscillate between two positions and, on the one hand, is pulled elastically by a return spring (15, 37) toward a first position in which it places the electric contact switch (17, 47) in a first state and, on the other hand, is placed in a second position in which it places the electric contact switch (17, 47) in a second state, in opposition to the return spring (15, 37), under the action of the return means (9) of the control element (8) when the control element (8) is controlled by the actuation element (4).

2. Device according to claim 1, wherein the planet carrier (14) constitutes a crosswise lever which is mounted to rotate freely around the shaft of the electric motor (2) and which carries the shafts (24a, 24b) of respective support of planet pinions (13a, 13b) which mesh simultaneously with the outer toothing of the sun gear (12) and with the inner toothing of the ring gear (11) of the planetary gear train, and wherein one of the ends (27) of the lever is able to come in contact with a plunger (28) of the electric contact switch (17) under the action of the rotation of the lever (14) while the other end (30) of the lever (14) rests on the helical return spring (15).

3. Device according to claim 2, wherein the return spring (15) is housed at least partially in a housing (34) of the lever (14) and around a shaft (26) one end of which constitutes a stop limiting the angle of rotation of the planet carrier (14).

4. Device according to claim 3, wherein the position of the stop end of the shaft (26) is adjustable in relation to the bottom of the housing (34) to make it possible to adjust the actuation course of the electric contact switch (17).

5. Device according to claim 4, wherein the end (30) of the crosswise lever which rests on the helical return spring (15) is placed with clearance between two stop cheeks (31, 32) solid with the body (18) of the reduction gear and which projects on a face of this body and wherein the return spring (15) rests on a first (32) of these cheeks and pulls a face of the end (30) of the lever in contact with the second cheek (31), while the return means (9) of the control element (8) tend to cause the lever to rotate in the direction of the first cheek (32) in contact with the stop pin (26).

6. Device according to claim 1, wherein the planet carrier (14) constitutes a crosswise lever which is mounted freely to rotate around the shaft of the electric motor (2) and which carries the shafts (24a, 24b) of respective support of planet pinions (13a, 13b) which mesh simultaneously with the outer toothing of the sun gear (12) and with the inner toothing of the ring gear (11), wherein an extension of the crosswise lever (14) carries an actuation pin (42) of the electric contact switch (47) while one of the shafts (24a or 24b) of support of the planet pinions (13a, 13b) constitutes a support for an end of the return spring (37) wound around an extension (38) of the planet carrier (14) and whose other end is mounted and wherein the actuation pin (42) is engaged with a clearance (j) in a hole (43) of an adjusting plate (44) whose position is adjustable in relation to the contact switch (47) to position the actuation course of its plunger (50) limited to said clearance (j).

7. Device according to claim 6, wherein the plunger (50) of the contact switch (47) is placed in the immediate vicinity of the actuation pin (42) so that the contact switch (47) is actuated when the control element (8) is controlled by the actuation element (4).

8. Device according to one of claims 6 or 7, wherein the electric contact switch (47) is kept locked in position by the adjusting plate (44), which is itself locked by an adjusting screw (45).

9. Device according to claim 1, wherein the electric motor (2) for actuating the planetary gear train (12, 11) is a stepping motor which is supplied with electric current, either continuously to maintain its position, or in pulses to advance or go back step by step.

* * * * *